United States Patent
Andersen et al.

(10) Patent No.: US 11,777,079 B2
(45) Date of Patent: Oct. 3, 2023

(54) SILICON-CARBON COMPOSITE ANODE FOR LITHIUM-ION BATTERIES

(71) Applicant: ELKEM AS, Oslo (NO)

(72) Inventors: Hanne Flaten Andersen, Oslo (NO); Jorunn Voje, Kristiansand (NO)

(73) Assignee: ELKEM ASA, Oslo (NO)

(*) Notice: Subject to any disclaimer, the term of this patent is extended or adjusted under 35 U.S.C. 154(b) by 454 days.

(21) Appl. No.: 15/549,585

(22) PCT Filed: Sep. 29, 2016

(86) PCT No.: PCT/NO2016/000025
§ 371 (c)(1),
(2) Date: Aug. 8, 2017

(87) PCT Pub. No.: WO2017/058024
PCT Pub. Date: Apr. 6, 2017

(65) Prior Publication Data
US 2018/0040880 A1 Feb. 8, 2018

(30) Foreign Application Priority Data

Sep. 29, 2015 (NO) .................... 20151278

(51) Int. Cl.
*H01M 4/36* (2006.01)
*H01M 4/13* (2010.01)
(Continued)

(52) U.S. Cl.
CPC ......... *H01M 4/364* (2013.01); *H01M 4/0404* (2013.01); *H01M 4/133* (2013.01);
(Continued)

(58) Field of Classification Search
CPC .... H01M 4/364; H01M 4/134; H01M 4/1395; H01M 4/625
See application file for complete search history.

(56) References Cited

U.S. PATENT DOCUMENTS

2007/0122712 A1   5/2007  Kang et al.
2007/0281216 A1*  12/2007 Petrat .................. H01M 4/386
                                                          429/324
(Continued)

FOREIGN PATENT DOCUMENTS

CN   101095251 A   12/2007
CN   103477473 A   12/2013
(Continued)

OTHER PUBLICATIONS

Choi et al., "Effect of Fluoroethylene Carbonate Additive on Interfacial Properties of Silicon Thin-Film Electrode", Journal of Power Sources, 161(2), p. 1254-1259 (Year: 2006).*
(Continued)

*Primary Examiner* — Ula C Ruddock
*Assistant Examiner* — Frank A Chernow
(74) *Attorney, Agent, or Firm* — Lucas & Mercanti, LLP

(57) ABSTRACT

The present invention describes a silicon-carbon composite anode tor lithium-ion batteries comprising 40-80 weight % of silicon particles, 10-45 weight % of carbon, consisting of carbon black and graphite, and a combination of carboxymethyl cellulose (CMC) and styrene butadiene rubber (SB.R) as a binder. The invention also comprises a method of manufacturing the anode and a Li-ion battery comprising the Si—C composite anode according to the present invention.

12 Claims, 4 Drawing Sheets

(51) Int. Cl.

| | | |
|---|---|---|
| *H01M 4/04* | (2006.01) | |
| *H01M 4/134* | (2010.01) | |
| *H01M 4/133* | (2010.01) | |
| *H01M 4/1393* | (2010.01) | |
| *H01M 4/1395* | (2010.01) | |
| *H01M 4/62* | (2006.01) | |
| *H01M 10/0567* | (2010.01) | |
| *H01M 10/0525* | (2010.01) | |
| *H01M 4/02* | (2006.01) | |

(52) U.S. Cl.
CPC ......... *H01M 4/134* (2013.01); *H01M 4/1393* (2013.01); *H01M 4/1395* (2013.01); *H01M 4/622* (2013.01); *H01M 4/625* (2013.01); *H01M 10/0567* (2013.01); *H01M 10/0525* (2013.01); *H01M 2004/027* (2013.01); *H01M 2300/0025* (2013.01)

(56) References Cited

U.S. PATENT DOCUMENTS

| | | | |
|---|---|---|---|
| 2010/0297502 A1 | 11/2010 | Zhu et al. | |
| 2012/0088155 A1* | 4/2012 | Yushin | H01M 4/622 |
| | | | 977/773 |
| 2013/0004843 A1* | 1/2013 | Suzuki | H01M 4/13 |
| | | | 429/211 |
| 2013/0216907 A1* | 8/2013 | Rayner | H01M 4/04 |
| | | | 429/211 |
| 2014/0234722 A1 | 8/2014 | Kyotani et al. | |
| 2015/0004488 A1* | 1/2015 | Abdelsalam | H01M 4/386 |
| | | | 429/218.1 |
| 2015/0056510 A1 | 2/2015 | Cho et al. | |
| 2015/0200395 A1 | 7/2015 | Stevanovic et al. | |
| 2016/0149220 A1 | 5/2016 | Uhm et al. | |
| 2016/0197352 A1 | 7/2016 | Blaser et al. | |
| 2016/0351892 A1 | 12/2016 | Sugimori et al. | |

FOREIGN PATENT DOCUMENTS

| | | |
|---|---|---|
| CN | 104040763 A | 9/2014 |
| CN | 104916865 A | 9/2015 |
| EP | 2919298 A1 | 9/2015 |
| JP | 2010282959 A | 12/2010 |
| JP | 2015517190 A | 6/2015 |
| KR | 20090066031 A | 6/2009 |
| KR | 101397415 B1 | 5/2014 |
| KR | 1020140128379 A | 11/2014 |
| KR | 1020150016944 A | 2/2015 |
| WO | 2012028858 A1 | 3/2012 |
| WO | 2013031993 A1 | 3/2013 |
| WO | 2013114094 A1 | 8/2013 |
| WO | 2013156888 A1 | 10/2013 |
| WO | 2015115051 A1 | 8/2015 |
| WO | 2016150639 A1 | 9/2016 |

OTHER PUBLICATIONS

Office Action dated Jul. 3, 2019 of corresponding Japanese Application No. 2017-555392 and English translation.
Korean Office Action (in English) dated Sep. 28, 2018 for corresponding Application No. 10-2017-7027775.
European Search Report for Corresponding European Patent Application No. 16852149, dated Apr. 12, 2019, pp. 1-7.
H. Buqa, et al; Study of styrene butadiene rubber and sodium methyl cellulose as binder . . . ; Science Direct; Journal of Power Sources; vol. 161; 2006; pp. 617-622.
K. Kierzek, et al; Towards the realistic silicon/carbon composite for Li-ion secondary battery anode; J. Appl. Electrochem; vol. 45; 2015; pp. 1-10.
H. S. Kim, et al; Electrochemical properties of carbon-coated Si/B composite anode for lithium ion batteries; Journal of Power Sources; vol. 189; 2009; pp. 108-113.
International Search Report dated Jan. 31, 2017 for PCT/NO2016/000025.
Written Opinion dated Jan. 31, 2017 for PCT/NO2016/000025.
Norwegian Search Report for Patent Application No. 20151278 dated Apr. 29, 2016.

* cited by examiner

SILICON-CARBON COMPOSITE ANODE FOR LITHIUM-ION BATTERIES

CROSS REFERENCE TO RELATED APPLICATION

This Application is a 371 of PCT/NO2016/000025 filed on Sep. 29, 2016 which, in turn, claimed the priority of Norwegian Patent Application No. 20151278 filed on Sep. 29, 2015, both applications are incorporated herein by reference.

TECHNICAL FIELD

The present invention relates to a silicon-carbon composite anode for lithium-ion batteries and a lithium-ion battery comprising such anode.

BACKGROUND ART

In line with rapid increase in use of fossil fuels, the demand for use of alternative energy or clean energy is increasing. Thus, the field of power generation and electricity storage, which use electrochemical reaction, is most actively studied.

The demand for secondary batteries as energy sources is rapidly growing. Among the secondary batteries, research on lithium secondary batteries having high energy density, high operating voltage, long cycle lifespan and low self-discharge rate has been underway and such lithium secondary batteries are commercially available and widely used.

A Li-ion battery cell as shown in FIG. 1a generally comprises a copper current collector for the anode and an aluminium current collector for the cathode, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. A graphite-based composite anode layer overlays the copper current collector and a lithium containing metal oxide-based composite cathode layer overlays the aluminium current collector. A porous separator is provided between the graphite-based composite anode layer and the lithium containing metal oxide-based composite cathode layer: a liquid electrolyte material is dispersed within the porous spacer or separator, the composite anode layer and the composite cathode layer. In some cases, the porous spacer or separator may be replaced by a polymer electrolyte material and in such cases the polymer electrolyte material is present within both the composite anode layer and the composite cathode layer.

In a modern Li-ion battery, the industry standard is to use a negative electrode made of graphite. Charging and discharging processes are performed while lithium ions of a cathode are repeatedly intercalated into and de-intercalated from an anode, see FIG. 1b. Standard graphite electrodes have a specific capacity of about 300 mAh/g, with the best commercially available materials coming up to 440 mAh/g. Although there are differences in theoretical capacities of batteries according to kinds of electrode active materials, in most cases, charge and discharge capacities are deteriorated as cycles proceed.

Silicon has received attention as an anode material for high energy density batteries. Silicon has a theoretical capacity greater than 4000 mAh/$g_{Si}$, but with the current technology available for the opposite, positive, electrode, there is little incentive to go beyond 1000 mAh/$g_{tot}$. Here the "$g_{Si}$" refers to the silicon fraction of the electrode and "$g_{tot}$" refers to the total of silicon, carbon, which is often added to increase the conductivity within the anode, and binder of a composite anode. In both carbon and silicon anodes, the anode material is particulate and the particulate mass is held together by a binder. However, silicon suffers from significant volume changes, as high as 400%, during the lithiation and delithiating reactions. This volume change is much larger than the volume change in carbon anodes. Because of the large volume change, it has proved difficult to find a binder for silicon anodes than for carbon anodes. The teachings of binders for carbon anodes are not transferrable to silicon anodes.

The repeated expansion and contraction on cycling will cause degradation and/or cracking of the silicon anode material. This can destroy the electrode integrity via electrical isolation between particles and current collector so that silicon performance is greatly compromised and exhibits very poor cycle life. Cyclability is the primary requirement for a negative battery electrode. Depending on markets, the target would be from 1.000 cycles for consumer electronics (CE) to >4.000 cycles for electric vehicles (EV) or >10.000 for grid balancing (Grid).

In the literature one can find a number of methods for Li-ion battery electrode manufacturing where, to suppress the detrimental effects and to improve the cycling performance, multiphase composites, nanostructured architectures, electrolyte additives and new types of binders in composite electrodes has been reported.

Commercial electrode binders predominantly used to fabricate secondary batteries include polyvinylidene fluoride (PVDF)-based polymers, PVDF homopolymers, polyvinylidene fluoride hexafluoropropylene copolymers, and polyvinylidene flouride-chlorotrifluoroethylene copolymers. The PVDF-based polymers are advantageous that they are stable both chemically and electrochemically, but may have environmental problems resulting from organic solvents, such as NMP (N-methyl-2-pyrrolidone), because they have to be dissolved in the organic solvents and used as binder compositions. The PVDF-based polymers are excellent in the binding characteristic with inorganic substance particles, such as active materials, because they act with it surrounding the circumference of the active materials, but are disadvantageous it that they must be used in a large quantity in order to exhibit and maintain sufficient adhesive strength because they have poor adhesive strength with a current collector such as metals. In order to solve the conventional problems concerned with the negative electrode fabricated using a non-aqueous solvent, methods in which a negative electrode is fabricated using water-dispersible solvents has been proposed in the prior art.

US 2011/0091775 A claims a battery which is capable of improving the characteristics of a negative electrode by adding a conduction agent to a water-based negative electrode and of improving a high efficiency charging lifespan characteristic and enabling high capacity charging in a short time by using specific additives in an electrolyte. In general, a negative electrode is fabricated by forming a negative electrode-forming mixture in which negative electrode active materials, a binder, etc. and a solvent are uniformly mixed in an appropriate ratio, coating the negative electrode-forming mixture on a current collector, and drying and compressing the result. It is preferred that the water-dispersible binder be used in an amount of 1 to 4 wt % based on the total amount of an electrode composition including the water-dispersible binder. The examples show negative electrode-forming mixtures consisting of graphite (as a major component), SBR and conductive carbon dispersed in water.

EP 2 797 146 A aims at developing a lithium secondary battery including an aqueous binder that enhances overall characteristics of a battery, imparts structural stability to an electrode, and has high adhesive strength. The examples show fabrication of anodes by mixing styrene-butadiene rubber (SBR), carboxymethyl cellulose (CMC) and natural graphite as an anode active material to prepare an anode mixture slurry, the anode mixture slurry was coated onto a current collector and the resulting structure was dried, thereby completing fabrication of an anode.

US 2014/0166939 A and US2011/0177393 A relates to composite materials for battery electrodes. The composite material includes greater than 0% and less than about 90% by weight of silicon particles. In US 2014/0166939 A the silicon particles have an average particle size between about 0.1 µm and about 30 µm and a surface including nanometer-sized features. The composite material also includes greater than 0% and less than about 90% by weight of one or more types of carbon phases. It is stated that in accordance with certain embodiments described, certain micron-sized silicon particles with nanometer surface features can achieve high energy density, and can be used in composite materials and/or electrodes for use in electro-chemical cells to improve performance during cell cycling. The process for anode fabrication in US 2014/0166939 A and US2011/0177393 generally include mixing components together, casting those components onto a removable substrate, drying, curing, removing the substrate, then pyrolysing the resulting samples. N-Methyl-2-pyrrolidone (NMP) was typically used as a solvent to modify the viscosity of any mixture and render it castable using a doctor blade approach.

In US 2015/0132644 A it is provided a negative electrode slurry composition capable of suppressing swelling of a negative electrode, a lithium ion secondary battery negative electrode, and a lithium ion secondary battery. The negative electrode slurry composition includes a binder resin, a water-soluble polymer, and a negative electrode active material, wherein the binder resin including (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., and the negative electrode active material including a carbon-based active material and a silicon-based active material.

In the presentation "Vehicle Technologies Program. Validation of Electrode Materials and Cell Chemistries. Wenquan Lu (PI) et al., Annual Merit Review and Peer Evaluation Washington, D.C. May 13-17, 2013" it is given a summary of achievements in the study. The study includes silicon electrode and testing of several binders, wherein the general electrode composition is 10% C-45, 30% silicon, 45% Al2 graphite and 15% binder. The best cycle performances of silicon electrode were obtained when polyacrylic acid (PAA) and alginic acid binders were used.

Despite the several reports on different methods for manufacturing silicon containing anodes for Li-ion batteries, there are no reports on anode materials having a high cycle lifetime (i.e. >1000 cycles) and discharge capacity.

In addition to the degradation and cracking of the silicon containing anode materials during lithiation and delithiation, resulting in poor cycle life and performance, the Li-ion battery performance is also dependent of another important factor. An important mechanism in the Li-ion secondary battery is the formation of a coating around the electrode due to decomposition of the electrolyte solution. Intercalation of lithium into the anode of the Li-ion battery happens at a very low potential, and decomposition of the electrolyte solution constituents is practically inevitable. A way of getting around this problem is by using an electrolyte that, together with the electrode material and lithium, decomposes into stable solid compounds that form a coating around the electrode. The coating, commonly referred to as the solid electrolyte interphase (SEI), should ideally prevent further decomposition of solvent by forming an impermeable as well as electronically isolating layer, but still be ionically conducting to allow lithium ions to pass from the electrolyte to the electrode While being essential for the successful operation of the Li-ion battery, the SEI also has some adverse effects on the battery performance. The most notable is the capacity loss caused by lithium being irreversibly bound in compounds during the formation of the interphase, observed as a reduced Coulombic efficiency for the first few charge/discharge cycles. During cycling, the volume change introduces large stresses into the electrodes. In combination with the brittleness of the electrode materials, these stresses can eventually lead to cracking of the electrode. This can lead to material losing electrical contact with rest of the electrode or the electrode itself delaminating from the current collector. The pulverization is also associated with a continuous formation of new surface area. This new surface area must be stabilized by forming an SEI, a process which involves irreversible loss of lithium, thereby yielding the low Coulombic efficiency observed in these materials.

Thus, the object of the present invention is to develop a composite anode material based on silicon and carbon in Li-ion batteries with high cycle stability and high discharge capacity. It is an object to obtain an anode material retaining high capacity after prolonged cycling.

Another object of the present invention is to develop a composite material based on silicon and carbon where silicon of optimum purity and morphology with respect to production costs and performance is mixed with carbon materials in a commercially viable way resulting in a product that can be used as anode material in Li-ion batteries.

The tests presented in present application include electrodes with commercially relevant loadings and current densities, produced with a method intended to be as close as possible to today's industrial production processes.

SUMMARY OF THE INVENTION

In battery science a spontaneous reaction is denoted discharging, while a forced reaction is denoted charging. For an anode in a full cell, this means that lithium intercalation would be denoted charging. However, in half-cells with a lithium chip as the counter electrode, the silicon electrode will behave as a cathode in the setup. Lithiation of the silicon electrode is therefore a discharge of the half cell. However, in the context of present application, lithiation of anode materials will always be denoted charging and delithiation is denoted discharging, regardless of its actual role in the cell.

In the context of the present invention, the term "Si—C composite anode" may also be denoted "Si—C composite", "Si—C composite material", "composite material" and to "composite anode".

The term "active particles" in the context of present invention refers to the silicon, carbon black and graphite in the Si—C composite material.

In the context of present invention the terms "particulate", "particle" and "powder" are intended to include a material in particulate form, whether the particulate material is in the form of single particles or an agglomeration of a plurality of particles.

In the context of present invention, when referring to silicon in the Si—C composite material, the term "silicon" is not limited to any special type, but includes Si in general with a purity of at least 99 weight % Si. The silicon may be a polysilicon produced from gas phase or a metallurgical produced silicon or a mixture thereof.

In a first embodiment the present invention provides a silicon-carbon composite anode for lithium-ion batteries comprising, based on the total mass of dry materials;
    40-80 weight % of silicon particles,
    10-45 weight % of carbon, consisting of carbon black and graphite, and
    a combination of carboxymethyl cellulose (CMC) and styrene butadiene rubber (SBR) as a binder.

In a first preferred embodiment of the silicon-carbon composite anode the amount of carbon black is 5-17.5 weight % and the amount of graphite is 5-30.0 weight %.

In a second preferred embodiment of the silicon-carbon composite anode the amount of binders CMC and SBR added up is 7.5-30 weight %.

In a third preferred embodiment of the silicon-carbon composite anode the anode comprises, based on the total mass of dry materials;
    50-70 weight % of silicon particles,
    12.5-17.5 weight % of carbon black
    8.5-20 weight % of graphite, and
    10-17.5 weight % of a combination of CMC and SBR as a binder.

In a fourth preferred embodiment of the silicon-carbon composite anode the mass ratio CMC/SBR is from 0.8:1 to 1:0.8.

In a fifth preferred embodiment of the silicon-carbon composite anode the anode comprises, based on the total mass of dry materials;
    50-70 weight % of silicon particles,
    12.5-17.5 weight % of carbon black
    8.5-12.5 weight % of graphite, and
    a combination of CMC and SBR as a binder in a mass ratio from 0.9:1 to 1:0.9.

In a sixth preferred embodiment of the silicon-carbon composite anode the anode comprises a metal foil as a current collector.

In a seventh preferred embodiment of the silicon-carbon composite anode the thickness of the Si—C composite material layer deposited on the metal foil current collector is 12.5-152.4 μm.

In a second embodiment of the present invention it is provided a method for the preparation of a Si—C composite anode, comprising the following steps:
    providing CMC and SBR binders in an aqueous solvent, weighting out desired quantities of silicon particles, carbon black and graphite,
    adding the said quantities of silicon particles, carbon black and graphite to the said binder solution forming a slurry,
    dispersing the slurry by shear mixing or ball milling forming a homogenous paste,
    tape-casting the paste on a current collector metal foil, and drying the pasted film.

In a first preferred embodiment of the method the aqueous solvent is a buffer solution at pH 3.

In a second preferred embodiment of the method the current collector metal foil is prepared by cutting the metal foil, cleaning and drying prior to tape-casting the paste.

In a third embodiment the present invention provides a lithium-ion battery comprising a cathode, an anode, current collectors, a non-aqueous liquid electrolyte and separator, wherein
    the anode is a Si—C composite according to the present invention as defined in claims 1-8.

In a preferred embodiment of the lithium-ion battery the electrolyte comprises fluoroethylene carbonate (FEC) as an additive.

The electrochemical performance of Li-ion batteries comprising Si—C composites according to present invention allows >1200 cycles at cycling capacity of 600 mAh/$g_{tot}$, or >1000 mAh/$g_{Si}$.

In an especially preferred embodiment of the present invention the Si—C composite electrode comprises, based on the total mass of dry materials;
    about 60 weight % of silicon particles,
    about 15 weight % of carbon black,
    about 10 weight % of graphite, and
    about 7.5 weight % of CMC and about 7.5 weight % of SBR.

BRIEF DESCRIPTION OF THE DRAWINGS

Embodiments of the invention will now be described with reference to the following drawings, wherein.

DETAILED DESCRIPTION OF THE INVENTION

Figure 1A:
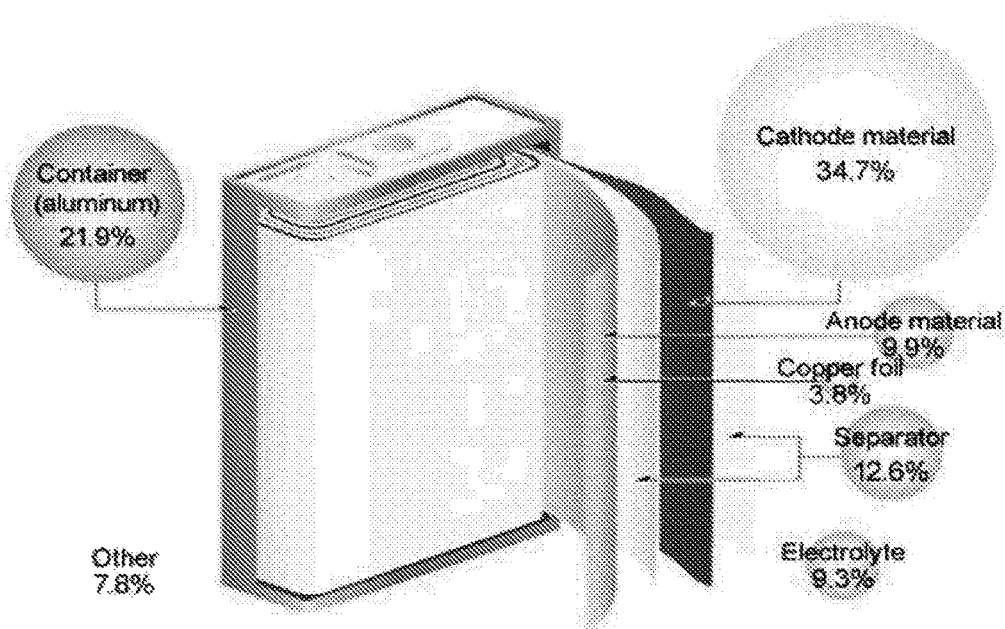
FIGS. 1a and 1b illustrate the fundamental principles of a Li-ion battery.
Figure 1B:
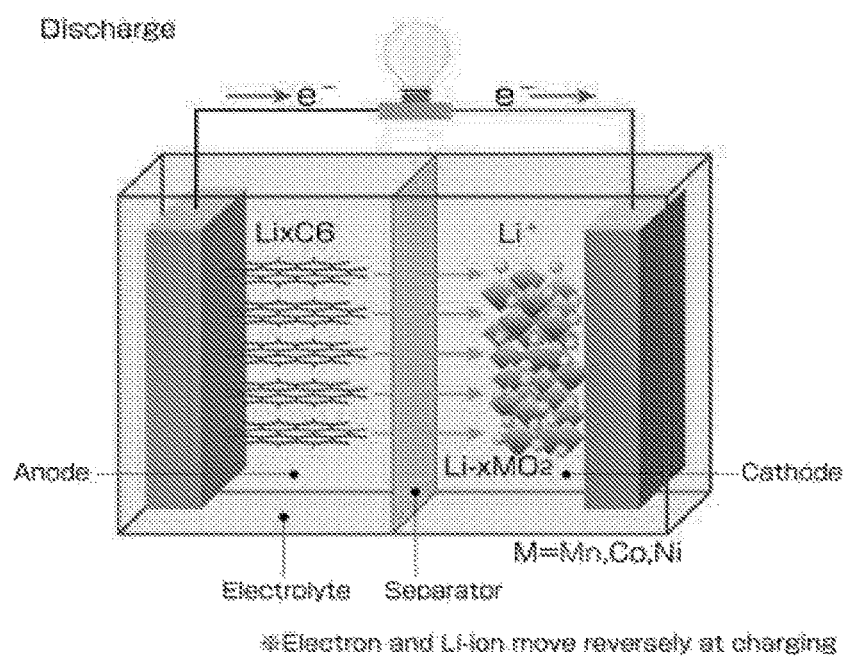
Figure 2:
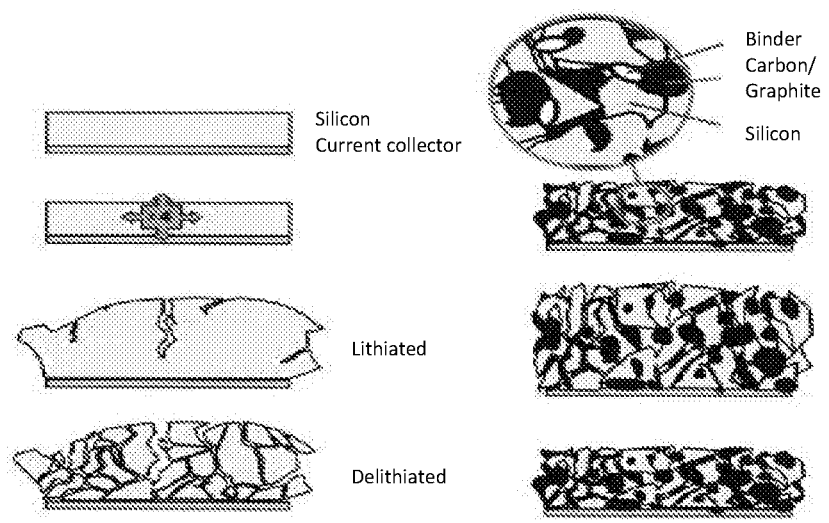
FIG. 2 illustrates the expansion of a silicon anode during lithiation and delithiation leading to disintegration of the silicon material vs. lithiation and delithiation of a Si—C composite anode according to present invention.

As indicated above, the object of the present invention is to provide a Si—C composite anode material for Li-ion batteries, where the said composite anode has high cycle stability, high discharge capacity, displaying a high capacity retention after prolonged cycling.

A further object is to provide a composite material based on silicon and carbon where silicon of optimum purity and morphology with respect to production costs and performance is mixed with carbon materials in a commercially viable way resulting in a product that can be used as anode material in Li-ion batteries.

The above mentioned objects have been achieved by means of a silicon-carbon composite anode for lithium-ion batteries comprising, based on the total mass of dry materials;

40-80 weight % of silicon particles,
10-45 weight % of carbon, consisting of carbon black and graphite, and
a combination of carboxymethyl cellulose (CMC) and styrene butadiene rubber (SBR) as a binder.

In the composite anode according to the present invention the amount of active materials and binders in the Si—C composite anode is given in weight percent based on the total amount of dry components in the slurry, that is silicon, carbon black, graphite, CMC and SBR.

The silicon in the Si—C composite material according to present invention is a particulate material. The term "particulate silicon" is herein intended to include any silicon material in particulate form, whether the silicon is in the form of single particles or an agglomeration of a plurality of particles. The type of silicon used in the Si—C composite electrode is not limited to any special type, but the Si should have a purity of at least 99 weight % Si, for instance at least 99.4 weight % Si, or at least 99.6 weight % Si. The silicon may be a polysilicon produced from gas phase or a metallurgical produced silicon or a mixture thereof. The silicon used in present Si—C composite anode is preferably a metallurgical produced silicon. The silicon particles used for production of the present Si—C composite anode preferably have a $D_{50}$ particle size between 1-10 µm, for instance 2-5 µm, e.g. 2.5 µM.

Table 1 gives examples of some metallurgical produced silicon types which may be used in the Si—C composite anode. However, the present invention is not limited to the silicon types shown in Table 1, as other metallurgically produced silicon may also be used in the Si—C composite anodes. The silicon used for preparing the present Si—C composite anode may also a pitch covered Si or heavily doped Si (n-doped or p-doped).

Metallurgical silicon is manufactured by firstly extract silicon from quartz rock, which consists of silicon and oxygen. It is extracted in a chemical process at high temperatures in which the oxygen in the quartz is bound to carbon, thus freeing the silicon from the oxygen. A smelting furnace is fed with quartz and various types of carbonaceous reduction materials, such as coke, coal, charcoal and wood chips. Carbonaceous electrodes are lowered into this mixture, and an electric arc is formed between the electrodes to provide high temperatures in the smelting furnace. This causes the oxygen in the quartz to react with the carbon in the carbonaceous material and form molten silicon and $CO_2$ gas. The $CO_2$ gas rises and the molten silicon is tapped from the furnace. The thus produced metallurgical silicon may contain different levels of Fe, Al, Ti, Ca as well as other impurities.

One particular metallurgical silicon, produced by Elkem AS and sold under the trademark Silgrain®, is manufactured by leaching lumps of 90-94% FeSi in a hot acidic solution of ferric chloride and hydrochloric acid. In the Silgrain® process the acid dissolves the impurities, mainly Fe, Al and Ca, breaking apart the lumps and leading to a granulated product of high purity silicon. One feature that characterizes the Silgrain® process and distinguishes it from other hydrometallurgical leaching processes is the rapid disintegration of FeSi into small grains during the reactions. Table 1 shows some examples of different grades of metallurgical silicon produced by Elkem AS. The chemical analysis gives the typical composition of the silicon material. However, although the above said Silgrain® silicon is a preferred silicon in the present composite anode, other metallurgically produced and hydrometallurgical leached silicon may be used for preparing the present Si—C composite anode.

TABLE 1

Examples of metallurgical produced silicon materials, produced by Elkem AS.

| Si-type | Si wt % | Fe wt % | Al wt % | Ca wt % | Ti wt % | P ppmw | B ppmv | Particle size, µm |
|---|---|---|---|---|---|---|---|---|
| Silicon 99 | 99.0 | 0.30-0.50 | N/A | Max. | 200-300** | 10-20 | N/A | |
| Silgrain ® silicon | 99.4 | 0.22 | 0.26 | 0.035 | 0.020 | 25 | 30 | 45-500 |
| Silgrain ® e-Si | 99.6 | 0.08 | 0.21 | 0.03 | 0.001 | N/A | N/A | * |
| Silgrain ® HQ | 99.8 | 0.04 | 0.09 | 0.013 | 0.001 | 25 | 30 | 200-800 |

Silgrain ® is a trademark belonging to Elkem AS and is used for a range of metallurgically produced silicon materials.
N/A value not available.
* Jet-milled to $D_{50}$ = 2.5 µm.
**ppmw High purity polysilicon is produced by other methods, the best known technique is the Siemens process. The Siemens technique grows high-purity silicon crystallites directly on the surface of high purity silicon seed rods by chemical decomposition of gaseous trichlorosilane blown over the rod's surface at 1150° C. While the conventional Siemens process produces electronic grade polysilicon at typically 9N-11N purity, that is, it contains impurity levels of less than one part per billion (ppb), the modified Siemens process is a dedicated process-route for the production of solar grade silicon (SoG-Si) with purities of 6N (99.9999%) and less energy demand compared to the conventional Siemens process.

A more recent alternative for the production of polysilicon is the fluidized bed reactor (FBR) manufacturing technology. Compared to the traditional Siemens process, FBR features a number of advantages that lead to cheaper polysilicon demanded by the fast-growing photovoltaic industry. Contrary to Siemens' batch process, FBR runs continuously, wasting fewer resources and requires less setup and downtime. It uses about 10 percent of the electricity consumed by a conventional rod reactor in the established Siemens process, as it does not waste energy by placing heated gas and silicon in contact with cold surfaces. In the FBR, silane (Sin) is injected into the reactor from below and forms a fluidized bed together with the silicon seed particles that are fed from above. The gaseous silane then decomposes and deposits silicon on the seed particles. When the particles have grown to larger granules, they eventually sink to the bottom of the reactor where they are continuously withdrawn from the process. The FBR manufacturing technology outputs polysilicon at 6N to 9N.

Comparing the energy consumption during the production of metallurgical silicon with polysilicon produced by the Siemens method, it is clear that the metallurgical route only uses a quarter of the energy. The main reason that the metallurgical method only requires a fraction of the energy is that the silicon is purified without converting it to a gaseous state and then back to silicon, which are the steps used in the traditional production.

The Si—C composite anode may comprise 20-80 weight % silicon. The Si—C composite anode according to the present invention comprises 40-80 weight % silicon, for instance 50-70 weight % Si, or 55-65 weight % Si. In an embodiment the composite anode comprises 60 weight % Si.

The carbon in the Si—C composite anode is used for two explicit purposes, to obtain long-range, back-bone conductivity, and to obtain good contact between the back-bone conductivity and the active silicon particles. The total amount of carbon in the Si—C composite anode should be 10-45 weight %, for instance 10-30 weight % carbon, or 15-weight % carbon. The carbon in the composite anode comprises both an amorphous phase with very small particle size (<100 nm), termed "carbon black" or "CB" and a carbon phase with relatively large particle size (>μm), termed "graphite". The carbon black has a particle size, from approximately 20 nm to about 100 nm, and provides conductivity between the active particles in the composite anode. The amount of carbon black in the composite anode is 5-17.5 weight %, for instance 10-17.5 weight % CB, or 12.5-17.5 weight % CB.

The relatively large graphite particles provide long-range backbone conductivity in the Si—C composite anode. The graphite is in the form of particulate material, having particle size from 2.5-50 μm, for instance 5-30 μm.

The amount of graphite in the Si—C composite anode is 5-30 weight %, for instance 8.5-20 weight % graphite, or 8.5-12.5 weight % graphite.

The binder in the Si—C composite anode according to present invention is a combination of carboxymethyl cellulose (CMC) and styrenebutadien rubber (SBR). The present inventors worked out a hypothesis that a dual binder, a combination of SBR binder and CMC binder in combination with particulate silicon, could create synergy with high flexibility and high mechanical stability. It was also believed that the two binders bond using both covalent and hydrogen bonds.

CMC or cellulose gum is a cellulose derivative with carboxymethyl groups (—CH$_2$—COOH) bound to some of the hydroxyl groups of the glucopyranose monomers that make up the cellulose backbone. CMC is represented by the following formula

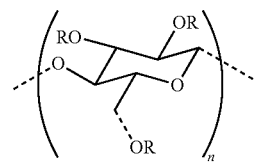

R = H or CH$_2$CO$_2$H

If nothing else is specified, the CMC binder is added as a powder together with the active materials during slurry processing.

The SBR is represented by the following formula

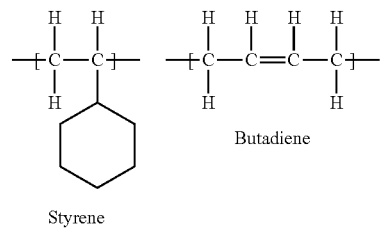

Styrene-butadiene rubber is a known binder from the synthetic rubber family. It is a relatively flexible polymer which is known to improve the mechanical stability in electrodes. SBR can also improve the adhesion to the current collector of aqueous processed electrodes. The SBR used for manufacturing the present Si—C composite anode should preferably be water soluble, i.e. a hydrophilic SBR type. The hydrophilic SBR may be added during the slurry processing as an aqueous suspension. The amount of SBR binder added to the said slurry is based on the amount of SBR in the SBR suspension.

The amount of binders CMC and SBR in the present Si—C composite anode is 7.5-30 weight %, for instance 10-17.5 weight %, or 12.5-15 weight %. The mass CMC:SBR ratio is from 0.8:1 to 1:0.8, for instance from 0.9:1 to 1:0.9, e.g. 1:1.

The method for preparing the Si—C composite anodes according to present invention is comprises the following steps:
  providing the desired amounts of CMC and SBR binders in an aqueous solvent,
  dry powder preparation; weighting out the desired quantities of silicon and carbon material,
  adding and mixing the said quantities of silicon and carbon material to the said binder solution forming a slurry,
  dispersing the slurry by shear mixing or ball milling forming a homogenous paste,
  tape-casting the paste on a current collector metal foil, and drying the pasted film.

The binder is prepared by mixing the binders with the solvent, stirring and sonicating for approximately 10 minutes. The solvent is water, preferably de-ionized water. The amount of binder in solvent should be 2.5-10 weight % for binders/water, or up to 7.5 weight % binders/water, alternatively up to 5.0 or 3.5 weight % binders/water. The solvent temperature is 20-70° C., for instance 25-50° C., or 35-45° C.

In a preferred embodiment the aqueous solvent includes a buffer controlling the pH-level of the slurry at pH 2-4, e.g. about pH 3. Buffering at pH 3 promotes covalent bonding (esterification) between the OH-groups of CMC. During the present work it was surprisingly found that the pH level of the slurry, in which the binders is mixed, has a very significant impact of the electrode performance and significantly improves the electrode cycle lifetime. In present work a buffer solution of citric acid and KOH, at pH 3 was used.

In the dry powder preparation, the desired amounts of silicon, carbon black powder and graphite is weighted up and added to the above prepared binder solution. The solvent to powder ratio should be from 6:1 to 2:1, for instance 5:1 to 3:1, e.g. 4:1, in this ratio the powder is the total mass of silicon, carbon black, graphite and binders in the slurry. The silicon particles may be pre-treated by milling before adding to the binder solution. A mixture of silicon and graphite; a mixture of silicon, graphite and carbon black; or a mixture of silicon and carbon black, may also be pre-milled before the powder is added to the binder solution. Pre-milling time may be 5-15 minutes.

The silicon particles, the carbon black and the graphite particles are added to the binder solution and mixed to form a slurry. The slurry is thereafter dispersed either by shear mixing and sonicating to provide a homogeneous slurry or paste, or by ball milling to provide a homogeneous slurry or paste. Shear mixing may for instance be done by using rotating speed 6k rpm for 35 minutes, followed by 5 minutes sonication. The milling may be done by planetary ball-milling, for instance with a Fritsch Pulverisette 7 Premium line using a 80 ml steel grinding bowl and sealing ring. In the present work the milling was done using 12 hardened steel balls (10 mm diameter). The milling speed was 500 rpm. The milling time may be 5-30 minutes, for instance 5-20 minutes, 5-15 minutes or 5-10 minutes. The milling may be performed in two steps, e.g. 2×5 minutes or 2×10 minutes, the pause between the milling periods may be 2-10 minutes, for instance 5 minutes.

After dispersing the silicon particles have mean particle size 500-700 nm, the particle size have been visually determined by using SEM and TEM characterizing.

The current collector is prepared by cutting a metal foil, cleaning and drying. The cleaning of the metal foil may be performed by using an alcohol as cleaning medium, e.g. ethanol, and the cleaning may be performed by dipping or submerging the metal foil in the cleaning medium, or wiping or spraying with the cleaning medium. The cleaned metal foil is dried, drying time may be approximately 2 hours at room temperature. The current collector may be a copper or steel foil with thickness 5-15 microns, for instance 8-12 microns or 9-10 microns.

The slurry/paste is deposited on the current collector by tape-casting. The doctor-blade height setting should be from 0.5 to 6 mills (12.5 to 152.4 μm), preferably from 2 to 4 mills (51 to 102 μm). By adjusting the solvent/powder ratio it is possible to obtain electrodes with similar loadings. When preparing the thinner electrodes the slurry has less solvent compared to the thicker ones.

The slurry/paste has primarily been characterized by observation. The fluctuations in homogeneity and viscosity have at times been so high that the samples were very easily classified as acceptable or non-acceptable. The criterions used include:

No visual separation between the different elements, such as silicon powder sinking to the bottom Sufficiently low viscosity to be able to use the mixer Sufficiently high viscosity to maintain shape during paste application and drying Visually homogeneous surface of the deposited electrode, no grains visible to the naked eye.

The pasted films are dried by firstly pre-drying in ambient air for about 18-24 hours, e.g. about 20 hours. Thereafter the drying is performed at vacuum atmosphere, at temperatures about 100-140° C., e.g. 110-120° C. The drying time is minimum 2-3 hours. Appropriate drying time is 2-6 hours.

Methods Used for Characterizing the Electrode Samples

Rheology

To understand the slurry behavior and the influence from parameters such as solvent type, solvent amount, Si type and general electrode composition, some initial rheology measurements were performed. A rheometer from Anton Paar was utilized for the measurements. All measurements were performed with plate-to-plate geometry at 20° C. The viscosity and the viscoelastic properties of the slurries were examined by measuring the shear stress/viscosity as a function of shear rate.

The sedimentation of the slurry was also studied by varying the mixing time and waiting time before measurement. In addition binder type and the pH-dependency of the solvent was examined.

Half-Cell Assembly and Electrochemical Characterization

Figure 3:
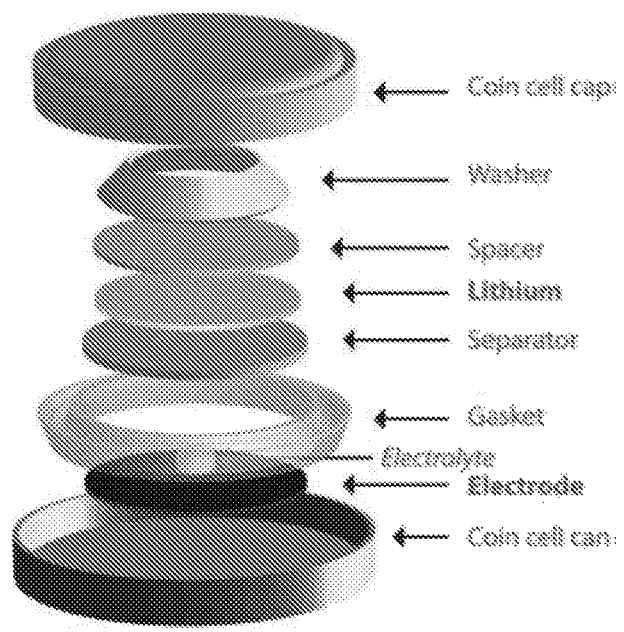
FIG. 3 illustrates the coin-cells from Hohsen Corp. (Japan) used in cycling experiments. The coin-cell set of type 2032 consists of a can, gasket, differently sized spacers, washer, and a coin-cell cap.

The cycling experiments on the electrodes were done using 2032-type coin-cells from Hohsen, as shown in FIG. 3.

Electrochemical Cycling and Analysis

Galvanostatic Cycling

A cycling scheme was developed to allow reproducible tests as well as to extract additional information about the electrodes. All tests starts with a rest period where the voltage is measured to find the open circuit voltage (OCV). This resting period was 24 hours as some electrodes require longer time to be completely wetted by the electrolyte. The test also includes internal resistance measurements where short current pulses are applied (IR). The first three discharge-charge cycles are done at reduced speed (C/20="C20"). The following cycles are done at C10. Note, since the measurements where done on half-cells with a lithium chip as the counter electrode, the silicon electrode will behave as a cathode in the setup. Lithiation of the silicon electrode is therefore a discharge of the half cell. Galvanostatic cycling where the full voltage range was used (with C10-rate) is denoted unrestricted cycling.

In order to not stress the Si during cycling, restricted cycling methods were developed. With restricted cycling, a given capacity (per gram Si) is set by limiting the time with a certain current density, and thus the voltage range of the cell is reduced. Typically the capacity value would be set to 1000 mAh/$g_{Si}$, and the voltage range would vary to accommodate this set capacity. In the initial cycles the voltage range would be reduced (from the standard 1.0-0.05 V) and the Si in the electrode would be less lithiated, thus less expanded. The C-rate for the restricted cycling was set to C/5 after an initial lithiation at C/20.

Some cells were also cycled with varying C-rate, where the C-rate would change from C/20 to 1C. Using higher current densities can tell a lot about the kinetics of the cell, and is a necessary complement to the internal resistance measurement.

dQ/dV Plots dQ/dV plots are used to illustrate more clearly at which voltages activity is going on in the cell. A normal charge or discharge curve contains areas with different slopes corresponding to different electrochemical processes. These can be difficult to separate or quantify with the naked eye. The dq/dV plot show the derivative of the curve, giving peaks at those voltages where the lithiation or delithiation is fastest as function of the voltage change. In intercalation materials, these peaks will typically be very sharp, while for the process of including lithium in silicon, the peaks are less sharp. This corresponds to the fact that both the lithiated and delithiated silicon is amorphous, so there is a wide spread in available energy levels for the ions. Peak broadening can also be due to kinetic limitations, the peaks will be somewhat narrower for slow charging processes.

Electrochemical Impedance Spectroscopy (EIS)

The electrochemical impedance spectroscopy method studies the response to the application of a periodic small-amplitude ac signal. Analysis of the system response contains information about the interface, its structure and the reactions taking place there. However, EIS is a sensitive technique, and it is a great challenge to correlate the right reactions to the system response. Thus, EIS is often used as a complementary process.

The impedance spectroscopy is usually represented with a Nyquist plot with a real part and an imaginary part. The Nyquist plot is made up of various electrical circuits, depending on the type of system. The challenge is to fit this Nyquist plot with a suitable equivalent circuit model and to understand which processes are taking place.

Figure 4:
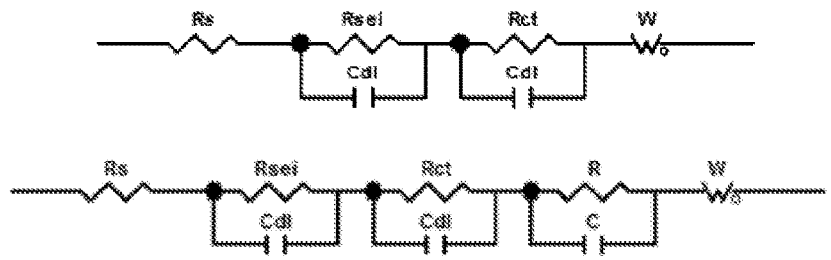
FIG. 4 illustrates typical electrical circuits used to analyse the EIS-data.

A well interpreted EIS can give information about the solution resistance ($R_s$), the resistance over the SEI-layer ($R_{SEI}$), the double-layer capacity ($C_{dl}$), the charge-transfer resistance ($R_{ct}$) as well as the diffusion (W). Typical RC-circuits of battery cells can be seen in FIG. 4.

TEM Analysis and Post-Mortem Characterization
TEM Sample Preparation

All cycled anodes were opened inside a glove box, rinsed by dimethyl carbonate (DMC) and dried inside the glove box. The anodes were removed from the inert glove box atmosphere and exposed to air before TEM (transmission electron microscope) preparation by dual-beam FIB-SEM (Focused ion beam scanning electron microscope). TEM preparation of un-cycled anodes were done by loading the anode into the FIB-SEM without any pretreatment. After TEM preparation, the final TEM sample was also exposed to air before the sample was loaded into the TEM.

Cycled and lithiated (or partly (de)lithiated) anodes were rinsed and dried inside a glove box ($O_2$ and $H_2O$ both less than 0.1 ppm). A clean scalpel was used to scrape the anode material off the Cu foil. The anode material was further grounded by a pestal and a mortar. An air brush was used to blow the fine powder onto a holey, amorphous carbon-coated Cu TEM grid. The TEM grid was mounted in an inert transfer TEM holder inside the glove box. The sample is surrounded by a pure glove box atmosphere until the sample is loaded into the column of the TEM. In the TEM the sample is exposed to an atmosphere of $10^{-6}$ Pa.

FIB-SEM and TEM Characterization

FIB-SEM was performed with FEI Helios Nanolab instrument. This is a dual-beam setup consisting of a FEG SEM and a Ge ion-beam, with a fixed angle of 52° between the two beams. The instrument is equipped with an X-ray energy dispersive spectroscopy (EDS) detector, 5 different gas injection needles for precise deposition of various materials, and an Omniprobe "lift-out-needle" for in-situ transfer of pieces of material. Pure SEM characterization was also performed with the FIB-SEM.

TEM was performed with a double Cs corrected (probe- and image-corrected) cold-FEG JEOL ARM 200F, operated at 200 kV. The ARM is equipped with a large solid angle (0.98 sr solid angle) Centurio silicon drift detector for EDS and a fast Quantum GIF with DualEELS.

EXAMPLES

The binders used are

CMC from Sigma-Aldrich; Sodium carboxymethyl cellulose, average Mw ~90,000. SBR from Targray; Modified Styrene-Butadiene Copolymer, Product code: PSBR-100, suspension in water, solid content 15%±0.5%, pH value 9.7±0.5.

The electrolyte used in the experiments is a commercially available LP30 from BASF, a mix of 1M $LiPF_6$ in 1:1 EC/DMC. (EC: ethylene carbonate, DMC: diethyl carbonate) In addition, the two additives VC (VC: vinyl carbonate) and FEC (FEC: Fluoroethylene carbonate) have been tested.

The electrolyte additive FEC used in the experiments is Fluoroethylene carbonate—99%, supplied from Sigma Aldrich.

Active materials, silicon, carbon black and graphite, which were used in the experiments are given in Tables 2-4 below.

TABLE 2

| Conductive additives, type and purity (from supplier). | | | | | | |
|---|---|---|---|---|---|---|
| | Type (conductive additive) | Purity (ash content. % | Fe (ppm) | Al (ppm) | Ca (ppm) | Si (ppm) |
| C-NERGY KS 6L | Graphite | 0.01 | 15 | 2 | 30 | 70 |
| C-NERGY Super C65 | Carbon Black | — | 2 | — | — | — |
| Timrex SLP30 (potato) | Graphite | 0.06 | <100 | <50 | <50 | <150 |

TABLE 3

| Additional data on conductive additives (from supplier). | | | | | |
|---|---|---|---|---|---|
| | Particle size, d50 (µm) | Specific BET s.a. ($m^2$/g) | Oil Absorption (g/100 g graphite) | Scott density (g/cm) | Absorption Stiffness value (ml/5 g) |
| C-NERGY KS 6L | 3.4 | 20 | 155 | 0.06 | — |
| C-NERGY Super C65 | — | 62 | — | — | 32 |
| Timrex SLP30 (potato) | 15-18 | 8 | — | 0.30 | — |

TABLE 4

| Silicon samples from Elkem. | | | |
|---|---|---|---|
| Label | Type | Description | Original label |
| Si_001 | Silicon powder | p-type; Boron-doped | Si—B, ca 1% Si |
| G_002 | Graphite | Graphite | A-2, 8.11.2012 |
| Si_003 | Silicon powder | Silgrain ® e-Si | e-Si x5 |
| Si_004 | Silicon pieces | Silgrain ® silicon | BREQ 8641 0.2-0.8 |
| Si_005 | Silicon pieces | n-type; 1200 ppm phosphor | |

In all examples the percentages are by weight % based on the total mass of Si, carbon black, graphite and binders present.

The Si—C composite anodes were prepared by the method according to present invention, as described above, and using the parameters in Table 5 below.

Si—C Composite Anode; 60% Si, 10% Graphite and 15% Carbon Black, 15% Binder

The effect of adjusting the pH of the slurry, type of binders and using restricted cycling capacity was investigated. The type of silicon, carbon black and graphite are shown in Table 5 below.

In this example CMC binder was used without and with pH adjustment of the slurry. Further SBR was used as a co-binder with CMC in the pH adjusted slurry. Next the effects of using additives to the electrolyte were also tested. The cells were tested using both restricted cycling and unrestricted cycling.

TABLE 5

Parameters for preparing and Si—C composite anode with composition; 60% Si, 10% graphite and 15% carbon black, 15% binder.

| | |
|---|---|
| Silicon type (Si) | Si_004 Silicon pieces, Silgrain ® silicon |
| Silicon pre-treatment | Ball milled (5 min) |
| Graphite type (G) | Timrex SLP30 from Timcal |
| Black Carbon type (CB) | Super C 65 |
| Binder type (B) | CMC |
| | CMC and SBR |
| Powder composition | 60% Si, 10% graphite, 15% CB, 15% CMC |
| | 60% Si, 10% graphite, 15% CB, |
| | 7.5% CMC, 7.5% SBR |
| Solvent | Deionized water |
| | Deionized water + buffer solution |
| | (pH 3, citric acid + KOH) |
| Solvent to powder ratio | 4:1 |
| Electrolyte | LP30 |
| | LP30 + FEC |
| Cell-type | Coin cell |
| Separator | Celgard 3401 |

Figure 5:
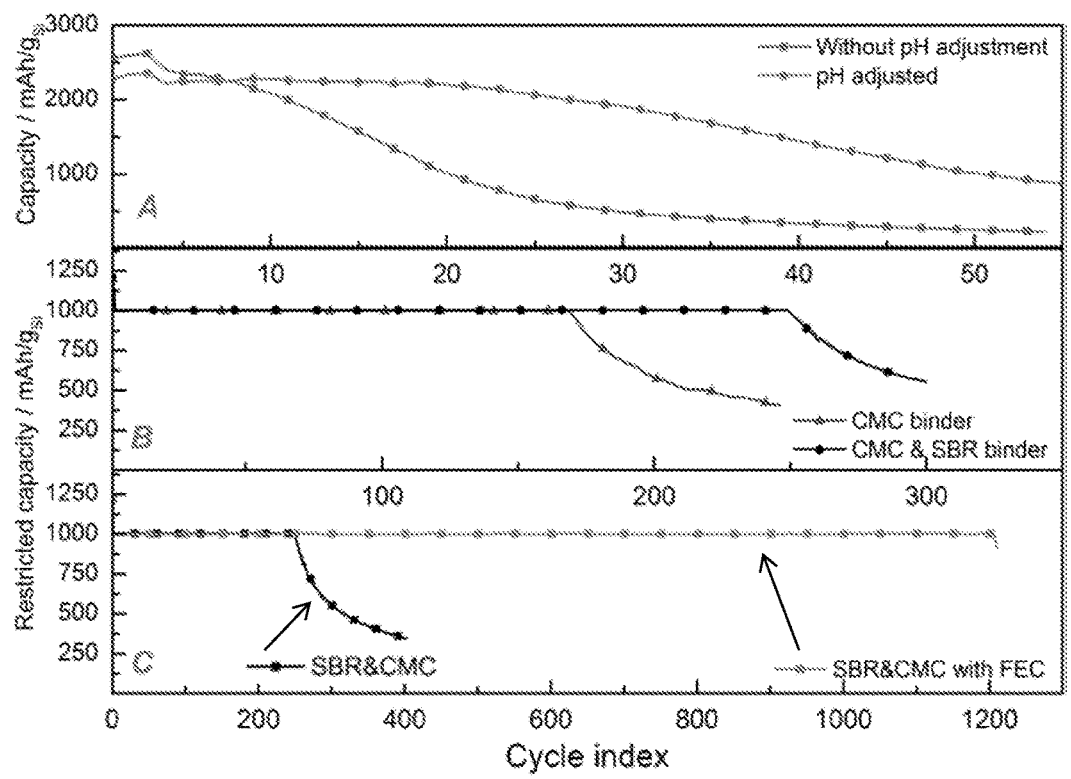
FIG. 5 shows the stepwise improvement by applying different binders and additives in a preferred embodiment of the present invention.

FIG. 5 shows the cycling results of electrodes (half-cells, coin-cells); showing, from top to bottom:

Top: Number of cycles vs. unrestricted capacity with and without pH adjustment of slurry using CMC as binder.

Middle: The effect of combining CMC and SBR binders, pH adjusted slurry and restricted capacity cycling.

Bottom: combination of CMC and SBR binders, pH adjusted slurry, FEC additive in electrolyte, using restricted capacity cycling.

The effect of changing the parameters is striking. In particular, the combined effects of binders and surfactants in the electrolyte showed great potential in reducing degradation. The most important findings were that FEC as an electrolyte additive greatly increases lifetime, using an acidic solution when mixing the CMC binder is highly effective, and the combination of a CMC and SBR binders in the same electrode give much better results than using only one binder.

Figure 6:
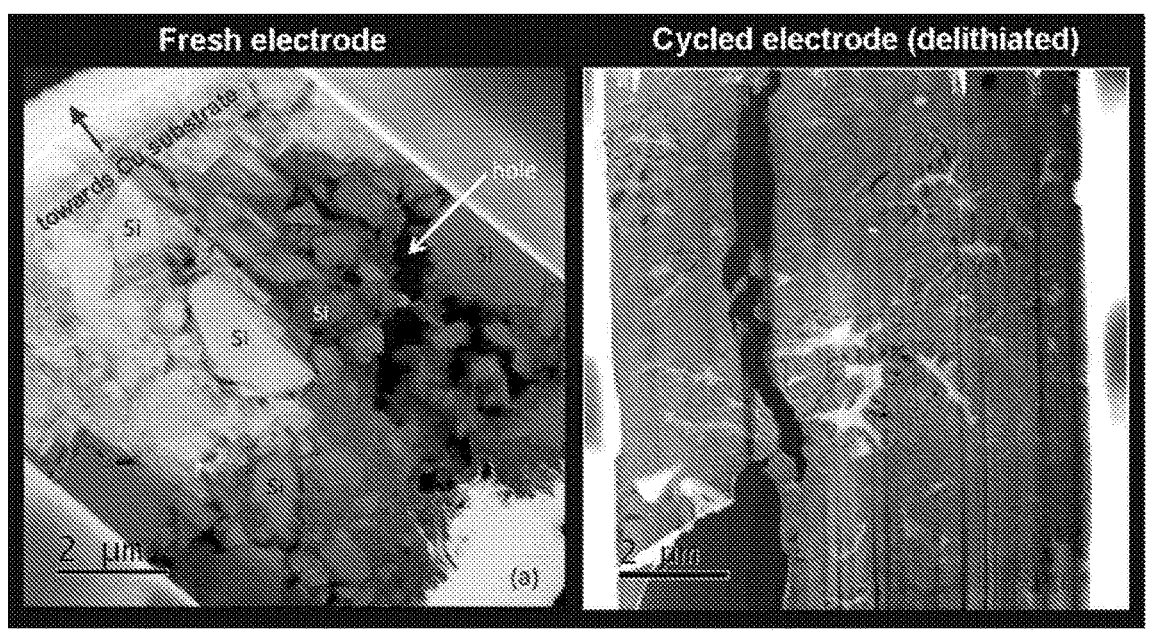
FIG. 6 shows cross-section views (prepared in the FIB-SEM) of a fresh electrode (a) and after prolonged cycling (b).

FIG. 6 shows cross-section views (prepared in the FIB-SEM) on the left side (a); a fresh anode on the current collector, before cycling, and on the right side (b); a delithiated anode after prolonged cycling. In the fresh anode the crystalline Si particles are clearly present. After cycling, the silicon particles sinter together (bright areas) and form a dendritic-like pattern with extremely high surface area. The dendritic surface area is likely to give poor electric conductance. Ionic conductance can also be reduced, depending on whether the remaining pores are empty or filled with electrolyte.

A strong effect was seen on the depth of charging. Capacity restricted cycling allows the electrodes to last much longer, as the expansion is less severe and the surface integrity remains. Originally, the inventors intended to use some carbon to buffer these changes, but the best results were obtained by having less buffering carbon, allowing the increased amount of silicon to be utilized to a lower degree.

The present Si—C composite anode shows a great improvement in cycle life at acceptable specific capacities. Over 1200 cycles were obtained at capacities of 1000 mAh/$g_{Si}$ (600 mAh/$g_{tot}$), which is more than 50% higher than the theoretical capacity of the commercially used anode, graphite. The improvement can be attributed to the synergy between the SBR with higher mechanical stability and CMC which provides the necessary flexibility as a binder. In addition, using FEC as electrolyte additive proved a great stabilizer for this restricted capacity.

The invention claimed is:

1. A silicon-carbon composite anode for lithium-ion batteries consisting of, based on the total mass of dry materials:
   40-80 weight % of silicon particles with a $D_{50}$ particle size between 1-10 μm,
   10-45 weight % of carbon, consisting of carbon black and graphite, wherein the amount of carbon black is 5-17.5 weight % and the amount of graphite is 5-30 weight %, and
   a combination consisting of carboxymethyl cellulose (CMC) and styrene butadiene rubber (SBR) as a binder wherein the amount of CMC and SBR as the binder is 7.5-30 weight % and the mass ratio CMC/SBR is from 0.8:1 to 1:0.8,
wherein lithium-ion batteries comprising said silicon-carbon composites allows >1200 cycles at cycling capacity of 600 mAh/$g_{tot}$, or >1000 mAh/$g_{Si}$.

2. The silicon-carbon composite anode according to claim 1, comprising, based on the total mass of dry materials
   50-70 weight % of silicon particles with the $D_{50}$ particle size between 1-10 μm,
   12.5-17.5 weight % of carbon black
   8.5-20 weight % of graphite, and
   10-17.5 weight % of the combination of CMC and SBR as the binder.

3. The silicon-carbon composite anode according to claim 1, comprising, based on the total mass of dry materials
   50-70 weight % of silicon particles with the $D_{50}$ particle size between 1-10 μm,
   12.5-17.5 weight % of carbon black
   8.5-12.5 weight % of graphite, and
   the combination of CMC and SBR as the binder in a mass ratio from 0.9:1 to 1:0.9.

4. The silicon-carbon composite anode according to claim 1, wherein the silicon-carbon composite anode comprises a metal foil as a current collector.

5. The silicon-carbon composite anode according to claim 4, wherein the thickness of the silicon-carbon composite material layer deposited on the metal foil current collector is 12.5-152.4 μm.

6. A method for preparing a silicon-carbon composite anode according to claim 1, comprising the following steps:
   providing CMC and SBR binders in an aqueous solvent,
   weighting out desired quantities of silicon particles, carbon black and graphite with the $D_{50}$ particle size between 1-10 μm,
   adding the said quantities of silicon particles, carbon black and graphite to the said binder solution forming a slurry,
   dispersing the slurry by shear mixing or ball milling forming a homogenous paste, tape-casting the paste on a current collector metal foil, and drying the pasted film.

7. The method according to claim 6, where the aqueous solvent is a buffer solution at pH 3.

8. The method according to claim 6, where the current collector metal foil is prepared by cutting the metal foil, cleaning and drying prior to tape-casting the paste.

9. A lithium-ion battery comprising a cathode, an anode, current collectors, a non-aqueous liquid electrolyte and separator, wherein the anode is a silicon-carbon composite as defined in claim 1.

10. The lithium-ion battery according to claim 9, wherein the electrolyte comprises fluoroethylene carbonate (FEC) as an additive.

11. The lithium-ion battery according to claim 9 allowing >1000 cycles, at a capacity of 1000 mAh/$g_{Si}$.

12. The lithium-ion battery according to claim 11 allowing >1200 cycles at a capacity of 1000 mAh/$g_{Si}$.

* * * * *